(12) United States Patent
Morris et al.

(10) Patent No.: US 8,893,874 B2
(45) Date of Patent: Nov. 25, 2014

(54) DOUGH PRODUCT ALIGNING METHOD AND DEVICE

(75) Inventors: Nigel Justin Morris, GC Enspijk (NL); Jan Vermeulen, ED Zuilichem (NL)

(73) Assignee: Johan Hendrik Bernard Kaak, Gaanderen (NL)

( * ) Notice: Subject to any disclaimer, the term of this patent is extended or adjusted under 35 U.S.C. 154(b) by 0 days.

(21) Appl. No.: 13/813,451

(22) PCT Filed: Jan. 27, 2012

(86) PCT No.: PCT/NL2012/050045
§ 371 (c)(1),
(2), (4) Date: May 1, 2013

(87) PCT Pub. No.: WO2012/102615
PCT Pub. Date: Aug. 2, 2012

(65) Prior Publication Data
US 2013/0292227 A1 Nov. 7, 2013

(30) Foreign Application Priority Data
Jan. 27, 2011 (NL) .................................... 2006080

(51) Int. Cl.
*B65G 47/30* (2006.01)
*B65G 47/24* (2006.01)
*A21C 9/08* (2006.01)

(52) U.S. Cl.
CPC ................ *B65G 47/24* (2013.01); *A21C 9/085* (2013.01)
USPC ........................................ 198/418.6; 198/431

(58) Field of Classification Search
CPC ....... B65G 47/52; B65G 47/56; B65G 47/082
USPC ........................................ 198/418.6, 431, 432
See application file for complete search history.

(56) References Cited

U.S. PATENT DOCUMENTS

| 3,527,173 | A | * | 9/1970 | Mullvain, Sr. et al. | ........ 425/432 |
| 4,940,130 | A | * | 7/1990 | Aquino et al. | ................ 198/432 |
| 6,098,782 | A | * | 8/2000 | Hardage et al. | ............ 198/418.6 |
| 6,105,270 | A | * | 8/2000 | Capetta et al. | ............. 198/418.6 |
| 6,434,912 | B1 | * | 8/2002 | Walz | ........................... 198/418.6 |
| 7,926,643 | B2 | * | 4/2011 | De Jong | ........................ 198/431 |

FOREIGN PATENT DOCUMENTS

| DE | 10 89 702 B | 9/1960 |
| EP | 0 962 141 A1 | 12/1999 |
| GB | 1 170 0473 A | 11/1969 |

* cited by examiner

Primary Examiner — James R Bidwell
(74) Attorney, Agent, or Firm — Ladas & Parry LLP

(57) ABSTRACT

A method and a device for aligning dough pieces on a conveying surface of a conveyor. The device is arranged for performing the following steps: providing at least one dough piece to a supply device arranged above the conveying surface; supplying the dough piece onto the conveying surface which is moving in a conveyance direction, and wherein the dough piece is supplied up-stream of a roller arranged at a distance above the conveying surface; blocking the conveyance of the dough piece by the roller, wherein the roller is driven to rotate in a rotation direction such that a peripheral velocity at a side of the roller facing the conveying surface is substantially opposite to the conveyance direction; temporarily reversing the rotation direction of the roller in order to pass the dough piece underneath the roller; and conveying the dough piece on the conveying surface.

23 Claims, 7 Drawing Sheets

008
DOUGH PRODUCT ALIGNING METHOD AND DEVICE

RELATED APPLICATION INFORMATION

This application is a 371 of International Application PCT/NL2012/050045 filed 27 Jan. 2012 entitled "Dough Product Aligning Method And Device", which was published in the English language on 2 Aug. 2012, with International Publication Number WO 2012/102615 A1, and which claims priority from Netherlands Patent Application 2006080, filed 27 Jan. 2011, the content of which is incorporated herein by reference.

BACKGROUND

The invention relates to a method and a device for aligning dough pieces a conveying surface of a conveyor, in particular in an aligned row on a conveyor in case of multiple adjacent arranged dough pieces.

Such a device is, for example, described in U.S. Pat. No. 3,187,873. This patent describes a device for delivering discrete pieces of dough to a feed conveyor leading to a treatment station. This device comprises a supply conveyor, an intermediate conveyor and the feed conveyor, and is used for transporting pieces of dough which are disposed in lengthwise spaced transverse rows on a supply conveyer. When the rows of dough pieces are correctly aligned on the supply conveyor, they will reach the intermediate conveyor in the same correct alignment and will also be transferred to the feed conveyor without change in the positions of the pieces relative to each other. However, if the rows of dough pieces are not correctly aligned, or instance due to an irregular placement of the pieces upon the supply conveyor, the pieces will successively reach the intermediate conveyor while the intermediate conveyor is standing still. Successively all the pieces of dough in the same row will be stopped when they reach the intermediate conveyor and finally, when all the pieces of dough in one row are correctly aligned along the intermediate conveyor, the intermediate conveyor resumes rotation, the pieces of dough of the same row will be lifted by the intermediate conveyor to the feed conveyor in correctly aligned positions and will continue on the feed conveyor in such correct alignment.

A disadvantage of the prior art device is, that the dough pieces are stopped by the intermediate conveyor, while the intermediate conveyor is standing still and the supply conveyor is continuously driven. This may result in an unwanted deformation of the dough pieces. In particular, since the dough pieces may arrive at the intermediate conveyor at different moments in time, this deformation of dough pieces which are stopped first can be different from the deformation of dough pieces which are stopped successively later.

It is an object of the present invention to provide a method and a device in which misplaced discrete dough pieces are automatically arranged into a predetermined aligned row of substantially equally shaped dough pieces.

SUMMARY OF THE INVENTION

According to a first aspect, the invention provides a method for aligning dough pieces on a conveying surface of a conveyor, comprising the steps of:

providing at least one dough piece to a supply device arrange above the conveying surface, wherein the at least one dough piece is temporarily held by said supply device;

supplying the at least one dough piece onto the conveying surface, wherein said conveying surface is moving in a conveyance direction, and wherein the at least one dough piece is supplied onto said conveying surface up-stream of a roller arranged at a distance above said conveying surface;

blocking the conveyance of the at least one dough piece by the roller, wherein said roller is driven to rotate in a rotation direction such that a peripheral velocity at a side of said roller facing said conveying surface is substantially opposite to said conveyance direction;

temporarily reversing said rotation direction of the roller in order to pass the at least one dough piece underneath said roller; and conveying the at least one dough piece on said conveying surface.

According to the method of the invention, the at least one dough piece is temporarily held by the supply device and than supplied onto the conveying surface. If the at least one dough piece supplied onto the conveying surface are not correctly aligned, for instance due to an irregular placement onto the supply conveyor, various parts the at least one dough piece will successively reach the roller and the conveyance of the at least one dough piece is blocked by the roller while the roller is driven in the first rotation direction. Successively the conveyance the at least one piece of dough will be stopped when reaching the roller. However due to the interaction of the movement of the conveyor and the roller, the dough pieces are rolled back over the conveying surface which is moving in the conveyance direction. This rolling back action aligns the at least one dough piece and in addition shapes the at least one dough piece in substantially a cylindrical shape. Finally, when the at least one dough piece are correctly aligned along the roller, the rotation direction of said roller is reversed to rotate in a second rotation direction such that a peripheral velocity at a side of said roller facing said conveying surface is substantially equal to said conveyance direction. The aligned at least one dough piece, having the substantially cylindrical shape, pass underneath said roller, and is conveyed in an aligned manner on said conveying surface. By repeating this method with subsequently provided at least one dough pieces, said subsequently provided dough pieces are automatically arranged on said conveyer in a predetermined aligned row of substantially equally shaped dough pieces.

In an embodiment, the at least one dough piece is pressed onto said conveying surface when they pass underneath said roller. Even a slight compression of the at least one dough piece onto said conveying surface provides a much more stable position of the at least one dough piece on the conveying surface. It substantially prevents the dough pieces from rolling away from the aligned position.

In an embodiment, the roller is moved between a first position close to the conveying surface for blocking the conveyance of the at least one dough piece, and a second position for passing the at least one dough piece of underneath said roller. Preferably the second position is at a larger distance above the conveying surface than the first position.

Alternatively, in an embodiment, the roller is arranged at a fixed distance above said conveying surface, and said distance is smaller than a cross-sectional diameter of said at least one dough piece. This embodiment provides a very easy mechanical layout which can be applied when the process allows for the aligned dough pieces to be more compressed and thus more flattened.

In an embodiment, the at least one dough piece is slowed down and/or diverted by said supply device before said at least one dough piece is supplied onto said conveying surface.

By slowing down and/of diverting the dough pieces, they can be supplied onto said conveying surface in a more controlled way.

In an embodiment wherein the at least one dough piece comprises two or more dough pieces, the supply device releases said dough pieces onto said conveying surface essentially at the same time.

In an embodiment, the at least one dough piece is held by a valve assembly of said supply device, said valve assembly having at least one valve bottom for in a first position supporting the at least one dough piece, which valve assembly is arranged at a distance above said conveying surface, and wherein the valve bottom is movable from said first position to a second position for supplying the at least one dough piece onto said conveying surface. In an embodiment, the valve bottom is rotatable from said first position to said second position. The supply device of this embodiment provides a first alignment of the dough pieces before supplying them onto the conveying surface, which first alignment is further improved by the alignment provided by the roller as stated above.

In an embodiment, the supply device comprises a first wall which provides a downward extending ramp, and wherein the dough pieces are guided by the ramp while said dough pieces are supplied onto the conveying surface. In an embodiment the ramp extends downwards in a direction towards the roller. When the dough pieces are supplied, their movement towards the conveying surface is guided. For example, the dough pieces may roll downwards along the ramp onto the conveying surface.

In an embodiment, the ramp is movable in the direction towards the roller, and is provided with an actuator which pushes the dough pieces towards the roller while said dough pieces are supplied onto the conveying surface. In an embodiment the dough pieces are pushed by the actuator, when the dough pieces on a part of the ramp near the conveying surface.

According to a second aspect, the invention provides an aligning device for dough pieces, comprising:

a conveying surface for conveying a stream of spaced apart dough pieces along a conveying direction, a supply device for at least temporarily holding at least one dough piece and for supplying said at least one dough piece onto said conveying surface, a roller arranged down-stream of said supply device and above the conveying surface, wherein said roller is rotatable in a first rotation direction for blocking the conveyance of the at least one dough piece, wherein in said first rotation direction a peripheral velocity at a side of said roller facing said conveying surface is substantially opposite to said conveyance direction, and wherein said roller is rotatable in a second rotation direction, opposite said first rotation direction, for passing the at least one dough piece underneath said roller.

In an embodiment, the roller is arranged at a distance above said conveying surface, and said distance is smaller than a cross-sectional diameter of said at least one dough piece.

In an embodiment, the roller is movable between a first position close to the conveying surface for blocking the conveyance of the at least one dough piece and a second position for passing the at least one dough piece underneath said roller. Preferably the second position is at a larger distance above the conveying surface than the first position.

In an alternative embodiment, the roller is arranged at a fixed distance above said conveying surface.

In an embodiment, the supply device is arranged for slowing down and/or diverting said at least one dough piece before said at least one dough piece is supplied onto said conveying surface.

In an embodiment, the supply device comprises a holding device for at least temporarily holding the at least one dough piece before said at least one dough piece is supplied onto said conveying surface.

In an embodiment, the holding device comprises a valve assembly having at least one valve bottom for in a first position supporting the at least one dough piece, which valve assembly is arranged at a distance above said conveying surface, wherein the valve bottom is movable from said first position to a second position for supplying the at least one dough piece onto said conveying surface.

In an embodiment, the valve bottom is rotatable from said first position to said second position.

In an embodiment, the supply device comprises a first wall which provides a downward extending ramp for guiding the dough pieces onto the conveying surface. In an embodiment, the ramp extends downwards in a direction towards the roller.

In an embodiment, the ramp is movable in the direction towards the roller, and is provided with an actuator for pushing the dough pieces towards the roller.

In an embodiment, the roller extends substantially transverse to said conveyance direction. In this case the at least one dough piece is aligned substantially transverse to said conveyance direction.

In an embodiment the supply device extends substantially parallel to said roller.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1:
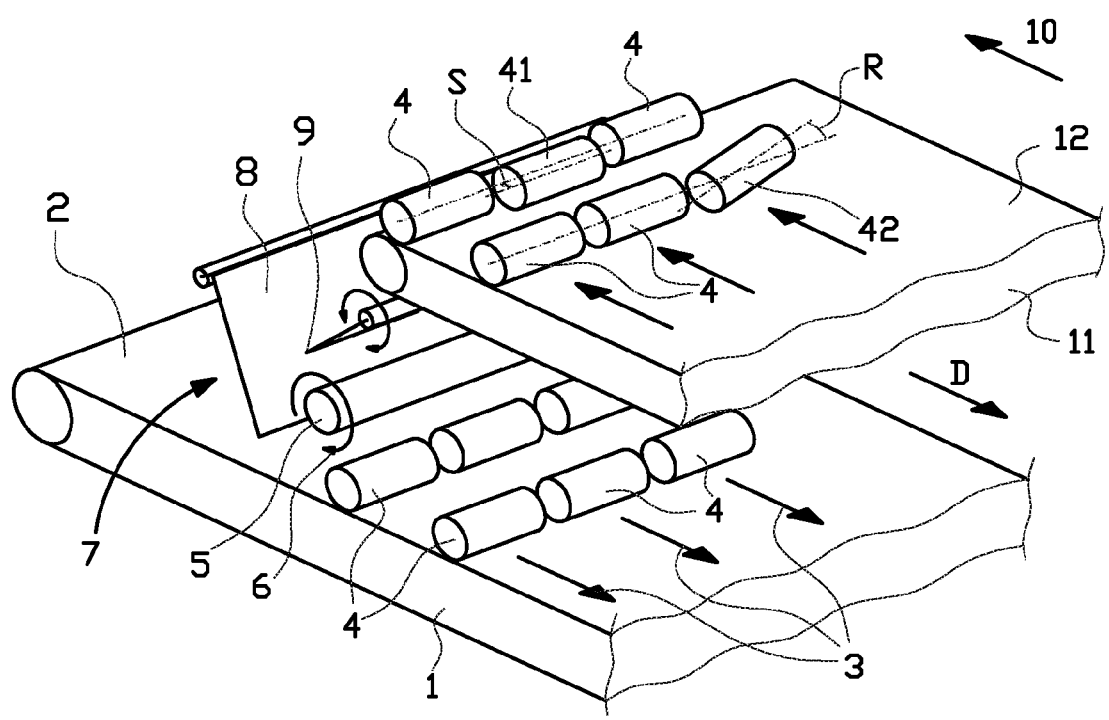
FIG. 1 shows a schematic view of a first example of an aligning device for dough pieces according to the invention.

FIG. 1 shows schematically a first example of a first conveyor 1, having a conveying surface 2 for conveying a plurality of streams of spaced apart elongated dough pieces 4 in parallel lanes 3 along a longitudinal conveyance direction D.

The conveyor 1 is provided with an aligning device for dough pieces, comprising a roller 5 which is arranged at a fixed distance d above said conveying surface 2, and said distance d is smaller than a cross-sectional diameter of said dough pieces 4. The roller 5 of this example extends substantially transverse to said longitudinal direction D, and having a width in order to cover three of said parallel lanes 3 of dough pieces. The roller 5 is rotatable in a first rotation direction 6 for blocking the conveyance of the dough pieces 4, wherein in said first rotation direction 6 a peripheral velocity at a side of said roller 5 facing said conveying surface 2 is substantially opposite to said conveyance direction D.

Figure 2A:
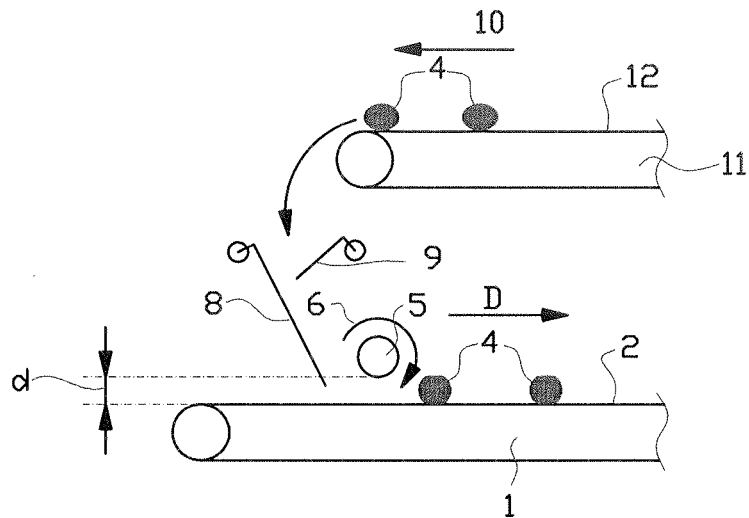
FIGS. 2A to 2D show schematic cross-sections of the device of FIG. 1 during various steps of the method of the invention.
Figure 2B:
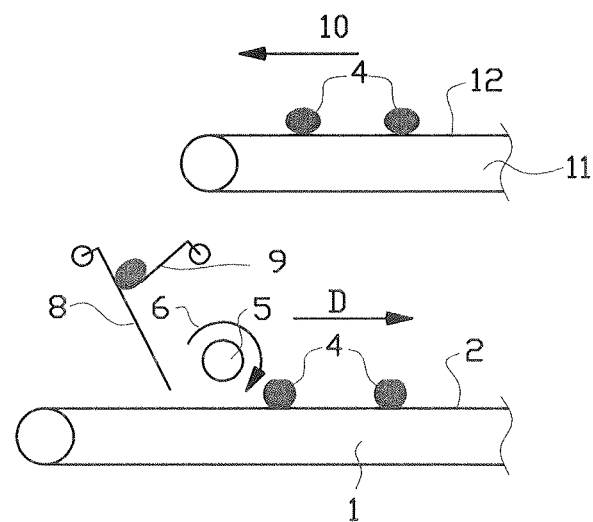
Figure 2C:
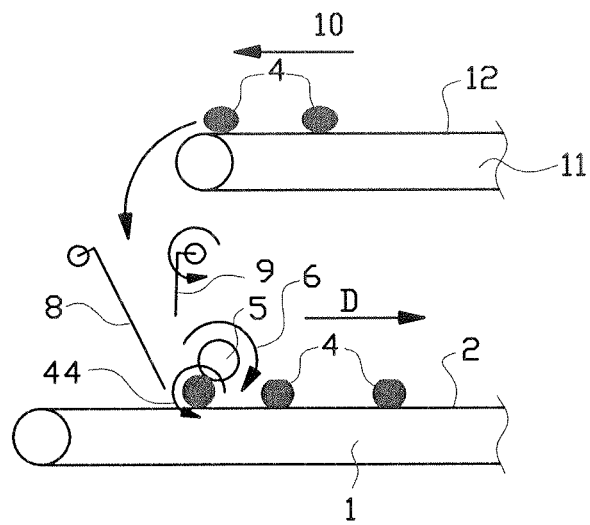

The aligning device for dough pieces further comprises a supply device 7 for supplying at least one dough piece, in this example three adjacent arranged dough pieces 4 onto said conveying surface 2, up-stream of said roller 5. The supply device 7 comprises a holding device for at least temporarily holding the dough pieces 4, before said dough pieces 4 are supplied onto said conveying surface 2. The holding device comprises a valve assembly 8,9 and comprises a first fixed wall 8, which provides a downwards extending ramp on which said dough pieces 4 may roll downwards onto the conveying surface 2, and a valve bottom 9, which is rotatable between a first position as shown in FIGS. 1, 2A and 2B to a second position as shown in FIG. 2C. In the first position, the opening between the fixed wall 8 and the valve bottom 9 is too small for dough pieces to pass through. In this position, the holding device forms a transversely extending elongated trough in which the set of adjacent dough pieces 4 are supported and roughly aligned. During the movement towards the second position, the valve bottom 9 swivels downward to enlarge the opening between the fixed wall 8 and the valve bottom 9 in order to supply the set of dough pieces 4 onto said conveying surface 2.

As shown in FIG. 1, dough pieces 4 are conveyed on a supply conveyor 11. The dough pieces 4 are arranged in rows on the surface 12 of the supply conveyor 11. As shown in FIG. 1, the dough pieces may be not correctly aligned, because dough pieces 41 may be shifted over a distance S in the conveyance direction 10 with respect to the other dough pieces 4 of a set and/or dough pieces 42 may be rotated over an angle R with respect to the other dough pieces 4 of a set. If the sets of dough pieces 4, 41, 42 are not correctly aligned, for instance due to an irregular placement of the pieces upon the supply conveyor 11, the pieces will successively reach the end of the supply conveyor 11 as shown in FIG. 2A and fall into the elongated trough formed by the fixed wall 8 and the valve bottom 9, as schematically indicated by the arrow in FIG. 2A.

The dough pieces 4 are temporarily held by the valve assembly 8, 9, until all dough pieces 4 of a set are in the trough. The trough provides a rough alignment of the dough pieces 4 of a set.

Subsequently, the valve bottom 9 is activated and swivels downwards. The set of dough pieces 4 roll along the ramp 8 down-to the support surface 2 of the first conveyor I and are conveyed towards the roller 5. Due to the rotation of the roller 5 in the first direction 6 and the movement of the conveying surfaced 2 in the conveyance direction D, the dough pieces 4 are driven to roll backwards 44. The rolling back action shapes the dough pieces 4 in substantially the same cylindrical shape, and holds them in substantially the same longitudinal position, as shown in FIG. 2C.

Finally, when all the pieces of dough 4 of one set are correctly aligned along the roller 5, the rotation direction of said roller 5 is reversed to rotate in a second rotation direction 6' such that a peripheral velocity at a side of said roller 5 facing said conveying surface 2 is substantially equal to said conveyance direction D. The aligned set of substantially the same cylindrical shaped dough pieces 4 pass underneath said roller 5, and are conveyed in an aligned row on said conveying surface 2 as shown in FIG. 2D.

The dough pieces 4 are pressed by said roller 5 onto said conveying surface 2 when they pass underneath said roller 5. The compression of the dough pieces by said fixed roller 5 onto said conveying surface 4 provides a much more stable position of the dough pieces 4 on the conveying surface 2. It substantially prevents the dough pieces 4 from rolling away from the aligned position.

Figure 2D:
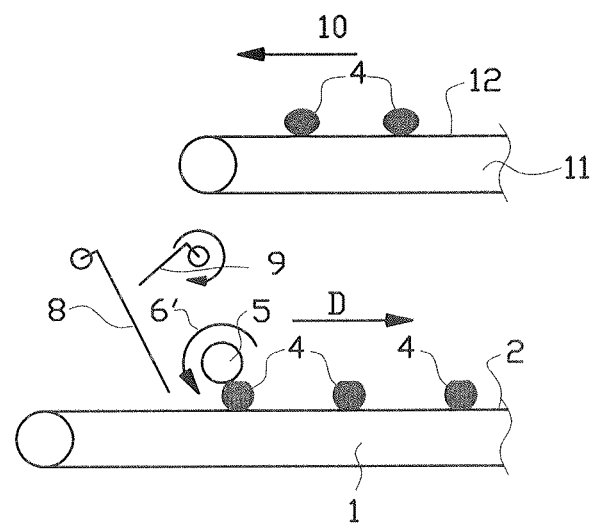

When the dough pieces 4 are on the support surface 2, near or against the roller 5, the valve bottom 9 can be swiveled back for holding the dough pieces 4 of the next set of dough pieces 4, as shown in FIG. 2D.

Figure 3:
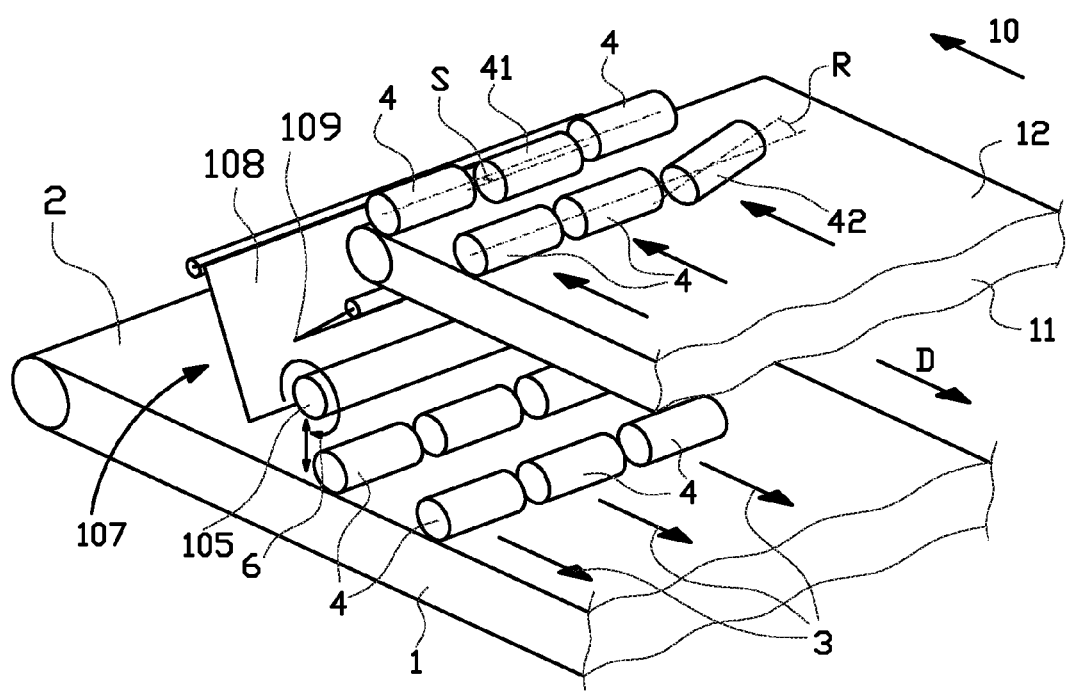
FIG. 3 shows a schematic view of a second example of an aligning device for dough pieces according to the invention.

FIG. 3 shows schematically a second example of a first conveyor 1, having a conveying surface 2 for conveying a plurality of streams of spaced apart dough pieces 4 in parallel lanes 3 along a longitudinal conveyance direction D.

The conveyor 1 is provided with an aligning device for dough pieces, comprising a roller 105 which is movably above said conveying surface 2. The roller 105 of this example extends substantially transverse to said longitudinal direction D, and having a width in order to cover three of said parallel lanes 3 of dough pieces. The roller 105 is rotatable in a first rotation direction 6 for blocking the conveyance of the dough pieces 4 as described in the first example above.

The aligning device for dough pieces further comprises a supply device 107 for supplying a set of dough pieces 4 onto said conveying surface 2, up-stream of said roller 105. The supply device 107 is arranged for slowing down—even stopping at least the horizontal movement in the direction 10 of the supply conveyor 11—and diverting said first set of dough pieces 4 before said dough pieces 4 are supplied onto said conveying surface 2. The supply device 107 comprises a first fixed wall 108, which provides a downwards extending ramp on which said dough pieces 4 may roll downwards onto the conveying surface 2, and a second fixed wall 109, which provides a downwards extending ramp on which said dough pieces 4 may roll downwards towards the first fixed wall 108. The opening between the first fixed wall 108 and the second fixed wall 109 is large enough for dough pieces 4 to pass through, in order to supply the set of dough pieces 4 onto said conveying surface 2.

Figure 4A:
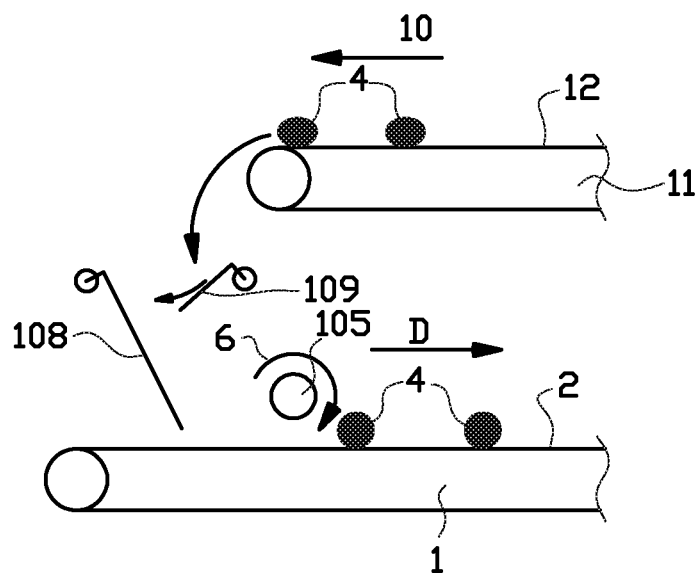
FIGS. 4A to 4D show schematic cross-sections of the device of FIG. 3 during various steps of the method of the invention.

As shown in FIG. 3, dough pieces 4 are conveyed on a supply conveyor 11. The dough pieces 4 are arranged adjacent in sets of three dough pieces 4 on the surface 12 of the supply conveyor 11. As shown in FIG. 3, the dough pieces may be not correctly aligned, because dough pieces 41 may be shifted over a distance S in the conveyance direction 10 with respect to the other dough pieces 4 of a set and/or dough pieces 42 may be rotated over an angle R with respect to the other dough pieces 4 of a set. If the dough pieces 4, 41, 42 are not correctly aligned, for instance due to an irregular placement of the pieces upon the supply conveyor 11, the pieces will successively reach the end of the supply conveyor 11 as shown in FIG. 4A and fall onto the second fixed wall 109. The dough pieces subsequently roll down the second fixed wall 109 towards the first fixed wall 108, as schematically indicated by the arrow in FIG. 4A.

Figure 4B:
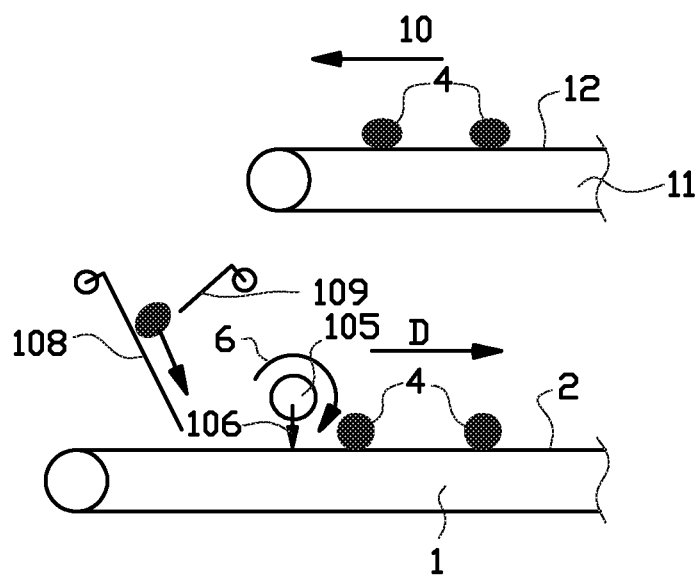

The horizontal movement—in the direction 10—of the dough pieces 4 is substantially stopped, when the dough pieces arrive at the first fixed wall 109. Subsequently the dough pieces 4 are diverted by the first fixed wall 109 to roll further downwards and providing a horizontal movement in the conveyance direction D, which in this example is substantially opposite the direction 10, as shown in FIG. 4B.

Figure 4C:
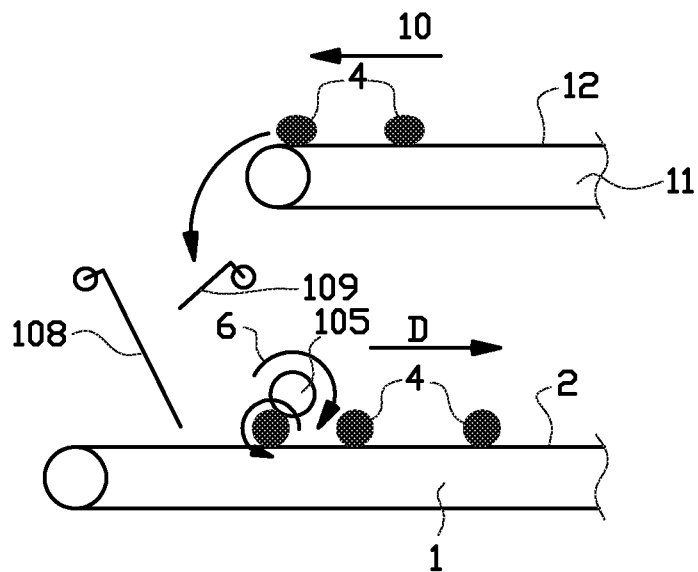

The set of adjacent dough pieces 4 roll along the ramp 108 down-to the support surface 2 of the first conveyor 1 and are conveyed towards the roller 105, which has moved in a first direction 106 towards the support surface 2 for blocking the passage of the dough pieces 4. Due to the rotation of the roller 105 in de first direction 6 and the movement of the conveying surfaced 2 in the conveyance direction D, the dough pieces 4 are driven to roll backwards. The rolling back action shapes the dough pieces 4 in substantially the same cylindrical shape, and holds them in substantially the same longitudinal position, as shown in FIG. 4C.

Figure 4D:
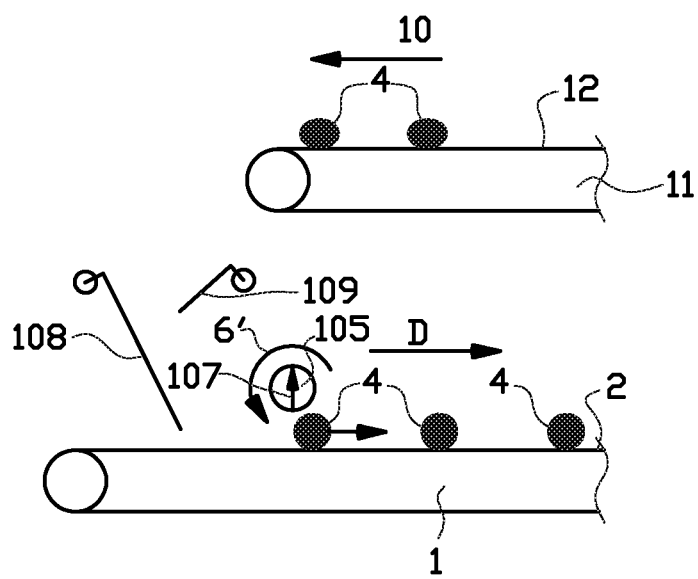

Finally, when all the pieces of dough 4 in one set are correctly aligned along the roller 105, the roller 105 is moved in upwards direction 107 such that the aligned set of substantially the same cylindrical shaped dough pieces 4 pass underneath said roller 105, and are conveyed in an aligned row on said conveying surface 2 as shown in FIG. 4D. An advantage of this embodiment is, that the dough pieces 4 need not be compressed, and cylindrical shape may be substantially retained.

However it is preferred that the rotation direction of said roller 105 is reversed to rotate in a second rotation direction 6' such that a peripheral velocity at a side of said roller 105 facing said conveying surface 2 is substantially equal to said conveyance direction D, in order to assist the conveyance of the aligned set of dough pieces 4 on the conveying surface 2, as shown in FIG. 4D.

Figure 5:
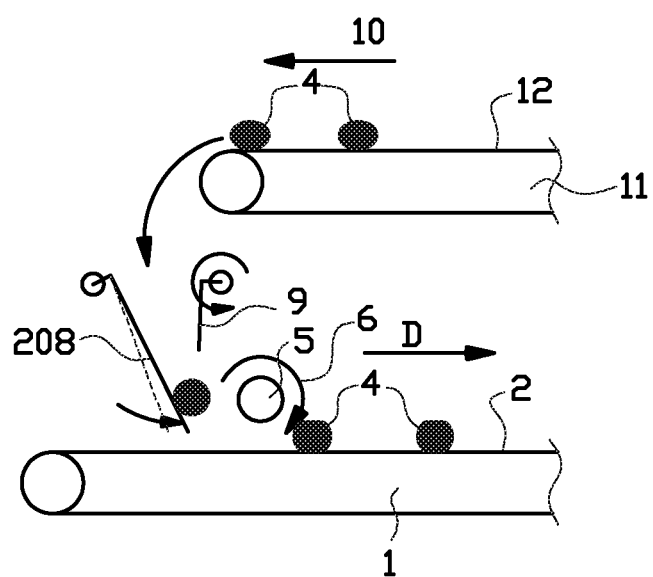
FIG. 5 shows a schematic cross-section of a third example of an aligning device for dough pieces according to the invention.

FIG. 5 shows schematically a third example of a first conveyor 1, having a conveying surface 2 for conveying a plurality of streams of spaced apart dough pieces 4 in parallel lanes along a longitudinal conveyance direction D.

In the first and second example discussed above, the holding device comprises a first fixed wall 8, 108 which provides a downwards extending ramp on which said dough pieces 4 may roll downwards onto the conveying surface 2. In this third example, the first wall 208 is substantially forward and backwards movable, in particular so as to swing or swivel, in the direction towards the roller 5. The first wall 208 is provided with an actuator (not shown) for providing a push action, for pushing the dough pieces 4 towards the roller 5 while said dough pieces 4 are supplied onto the conveying surface 2. Preferably the push action is initiated when the dough pieces 4 are on a part of the ramp 208 near the conveying surface 2, as shown in FIG. 5.

In the example of FIG. 5 the moveable ramp 208 is used in stead of the first fixed wall 8 in the first example. Such a movable ramp 208 may also be used in stead of the first fixed wall 108 in the second example.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

For example, in the first example also the first wall 8 may be arranged to swivel downwards to assist the action of the valve bottom 9 to enlarge the opening between the wall 8 and the valve bottom 9.

In an other example the valve assembly 8,9 of the first example can be combined with the moving roller 105 of the second example.

Also the fixed supply device 107 of the second example can be combined with the fixed roller 5 of the first example.

In the examples, the method and device of the invention are used for aligning a set of adjacent arranged elongated dough pieces. In stead the method and device can also be used for a single dough piece, in particular a single longer product.

In summary, the present invention relates to a method and a device for aligning dough pieces in a row on a conveying surface. The device is arranged for performing the following steps:

providing at least one dough piece to a supply device arrange above the conveying surface;
supplying the dough piece onto the conveying surface which is moving in a conveyance direction, and wherein the dough piece is supplied up-stream of a roller arranged at a distance above said conveying surface;
blocking the conveyance of the dough piece by the roller, wherein said roller is driven to rotate in a rotation direction such that a peripheral velocity at a side of said roller facing said conveying surface is substantially opposite to said conveyance direction;
temporarily reversing said rotation direction of the roller in order to pass the dough piece underneath said roller; and
conveying the dough piece on said conveying surface.

The invention claimed is:

1. Method for aligning dough pieces on a conveying surface of a conveyor, comprising the steps of:
providing at least one dough piece to a supply device arrange above the conveying surface, wherein the at least one dough piece is temporarily held by said supply device;
supplying the at least one dough piece onto the conveying surface, wherein said conveying surface is moving in a conveyance direction, and wherein the at least one dough piece is supplied onto said conveying surface up-stream of a roller arranged at a distance above said conveying surface;
blocking the conveyance of the at least one dough piece by the roller, wherein said roller is driven to rotate in a rotation direction such that a peripheral velocity at a side of said roller facing said conveying surface is substantially opposite to said conveyance direction;
temporarily reversing said rotation direction of the roller in order to pass the at least one dough piece underneath said roller; and
conveying the at least one dough piece on said conveying surface.

2. Method according to claim 1, wherein the at least one dough piece is pressed onto said conveying surface when passing underneath said roller.

3. Method according to claim 1, wherein the roller is moved between a first position close to the conveying surface for blocking the conveyance of the at least one dough piece and a second position for passing the at least one dough piece underneath said roller.

4. Method according to claim 1, wherein the roller is arranged at a fixed distance above said conveying surface, and said distance is smaller than a cross-sectional diameter of said at least one dough piece.

5. Method according to claim 1, wherein the at least one dough piece is slowed down and/or diverted by said supply device before said at least one dough piece is supplied onto said conveying surface.

6. Method according to claim 1, wherein the at least one dough piece is held by a valve assembly of said supply device, said valve assembly having at least one valve bottom for in a first position supporting the at least one dough piece, which valve assembly is arranged at a distance above said conveying surface, wherein the valve bottom is movable from said first position to a second position for supplying the at least one dough piece onto said conveying surface.

7. Method according to claim 6, wherein the valve bottom is rotatable from said first position to said second position.

8. Method according to claim 1, wherein the supply device comprises a first wall which provides a downward extending ramp, and wherein the dough pieces are guided by the ramp while said dough pieces are supplied onto the conveying surface.

9. Method according to claim 8, wherein the ramp extends downwards in a direction towards the roller.

10. Method according to claim 8, wherein the ramp is movable in the direction towards the roller, and is provided with an actuator which pushes the dough pieces towards the roller while said dough pieces are supplied onto the conveying surface.

11. Aligning device for dough pieces, comprising:

a conveying surface for conveying a stream of spaced apart dough pieces along a conveying direction, a supply device for at least temporarily holding at least one dough piece and for supplying the at least one dough piece onto said conveying surface, a roller arranged down-stream of said supply device and above the conveying surface, wherein said roller is rotatable in a first rotation direction for blocking the conveyance of the at least one dough piece, wherein in said first rotation direction a peripheral velocity at a side of said roller facing said conveying surface is substantially opposite to said conveyance direction, and wherein said roller is rotatable in a second rotation direction, opposite said first rotation direction, for passing the at least one dough piece underneath said roller.

12. Aligning device for dough pieces according to claim 11, wherein the roller is arranged at a distance above said conveying surface, and said distance is smaller than a cross-sectional diameter of said at least one dough piece.

13. Aligning device for dough pieces according to claim 11, wherein the roller is movable between a first position close to the conveying surface for blocking the conveyance of the at least one dough piece, and a second position for passing the at least one dough piece underneath said roller.

14. Aligning device for dough pieces according to claim 11, wherein the roller is arranged at a fixed distance above said conveying surface.

15. Aligning device for dough pieces according to claim 11, wherein the supply device is arranged for slowing down and/or diverting said at least one dough piece before said at least one dough piece is supplied onto said conveying surface.

16. Aligning device for dough pieces according to claim 11, wherein the supply device comprises a holding device for at least temporarily holding the at least one dough piece before said at least one dough piece is supplied onto said conveying surface.

17. Aligning device for dough pieces according to claim 16, wherein the holding device comprises a valve assembly having at least one valve bottom for in a first position supporting the at least one dough piece, which valve assembly is arranged at a distance above said conveying surface, wherein the valve bottom is movable from said first position to a second position for supplying the at least one dough piece onto said conveying surface.

18. Aligning device for dough pieces according to claim 17, wherein the valve bottom is rotatable from said first position to said second position.

19. Aligning device for dough pieces according to claim 11, wherein the supply device comprises a first wall which provides a downward extending ramp for guiding the dough pieces onto the conveying surface.

20. Aligning device for dough pieces according to claim 19, wherein the ramp extends downwards in a direction towards the roller.

21. Aligning device for dough pieces according to claim 19, wherein the ramp is movable in the direction towards the roller, and is provided with an actuator for pushing the dough pieces towards the roller.

22. Aligning device for dough pieces according to claim 11, wherein the roller extends substantially transverse to said conveyance direction.

23. Aligning device for dough pieces according to claim 11, wherein the supply device extends substantially parallel to said roller.

\* \* \* \* \*